United States Patent
Sedlar et al.

(10) Patent No.: US 9,062,773 B2
(45) Date of Patent: Jun. 23, 2015

(54) RADIAL SHAFT SEAL, RADIAL SHAFT SEAL ASSEMBLY AND METHOD OF INSTALLATION

(75) Inventors: Brent R. Sedlar, Ann Arbor, MI (US); David M. Toth, Brighton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 136 days.

(21) Appl. No.: 13/042,533

(22) Filed: Mar. 8, 2011

(65) Prior Publication Data
US 2012/0228829 A1  Sep. 13, 2012

(51) Int. Cl.
*F16J 15/32* (2006.01)
(52) U.S. Cl.
CPC .......... *F16J 15/3224* (2013.01); *F16J 15/3244* (2013.01)
(58) Field of Classification Search
USPC .......................... 277/309, 353, 551, 562, 561
See application file for complete search history.

(56) References Cited

U.S. PATENT DOCUMENTS

| | | | |
|---|---|---|---|
| 2,635,907 A | 4/1953 | Heimbuch | |
| 2,736,586 A | 2/1956 | Riesing | |
| 2,743,947 A | 5/1956 | Foss | |
| 3,941,396 A | 3/1976 | Bailey et al. | |
| 4,021,049 A | 5/1977 | Phelphs et al. | |
| 4,061,346 A | 12/1977 | Coleman et al. | |
| 4,274,641 A | 6/1981 | Cather, Jr. | |
| 4,449,717 A | 5/1984 | Kitawaki | |
| 4,575,104 A * | 3/1986 | Nagasawa et al. ............ | 277/551 |
| 4,588,195 A * | 5/1986 | Antonini et al. .............. | 277/504 |
| 4,650,196 A * | 3/1987 | Bucher et al. .................. | 277/553 |
| 4,699,526 A * | 10/1987 | Sato .............................. | 384/486 |
| 4,721,314 A | 1/1988 | Kanayama | |
| 4,750,748 A * | 6/1988 | Visser ........................... | 277/561 |
| 4,770,548 A | 9/1988 | Otto | |
| 4,844,484 A * | 7/1989 | Antonini et al. .............. | 277/561 |
| 4,940,248 A | 7/1990 | Kilthau et al. | |
| 4,968,044 A | 11/1990 | Petrak | |
| 5,085,444 A * | 2/1992 | Murakami et al. ............ | 277/503 |

(Continued)

FOREIGN PATENT DOCUMENTS

DE  3612420  10/1987
DE  3613220  10/1987

(Continued)

OTHER PUBLICATIONS

International Search Report PCT/US2012/027665 mailed on May 31, 2012.

*Primary Examiner* — Kristina Fulton
*Assistant Examiner* — Eugene G Byrd
(74) *Attorney, Agent, or Firm* — Robert L. Stearns; Dickinson Wright, PLLC

(57) ABSTRACT

A radial shaft seal configured for receipt in a housing and about a shaft to sealingly isolate an air side of the seal from an oil side of the seal is provided. The seal includes a mounting portion and a seal lip having a sealing surface extending between an oil side end and a free air side end. An annular bridge is connected to the oil side end of the seal lip by a first hinge and to the mounting portion by a second hinge. The bridge extends in radially overlying relation to the seal lip. A projection extends from the first hinge away from the bridge. A plurality of ribs extend radially inwardly from the projection. The ribs minimize friction between the seal and the shaft during installation and prevent the seal lip from inverting during the oil-side installation assembly.

17 Claims, 15 Drawing Sheets

(56) References Cited

U.S. PATENT DOCUMENTS

| | | | |
|---|---|---|---|
| 5,348,314 A * | 9/1994 | Antonini | 277/551 |
| 6,029,980 A * | 2/2000 | Downes | 277/552 |
| 6,105,968 A | 8/2000 | Yeh et al. | |
| 6,601,855 B1 | 8/2003 | Clark | |
| 6,619,664 B1 | 9/2003 | Metz | |
| 6,783,130 B2 * | 8/2004 | Hashida et al. | 277/551 |
| 6,866,271 B2 | 3/2005 | MacDonald | |
| 6,921,080 B2 | 7/2005 | Johnen | |
| 7,134,669 B2 | 11/2006 | Uhrner | |
| 7,182,346 B2 | 2/2007 | Yamamoto et al. | |
| 7,284,758 B1 | 10/2007 | Hart et al. | |
| 7,458,586 B2 | 12/2008 | Salameh | |
| 7,464,942 B2 | 12/2008 | Madigan | |
| 7,770,897 B2 * | 8/2010 | Berdichevsky | 277/551 |
| 7,823,887 B2 | 11/2010 | Geldenhuys | |
| 8,028,998 B2 * | 10/2011 | Schleker et al. | 277/551 |
| 8,313,106 B2 * | 11/2012 | Ting et al. | 277/562 |
| 2003/0006563 A1 | 1/2003 | Carter et al. | |
| 2003/0189293 A1 | 10/2003 | Johnen | |
| 2004/0124587 A1 | 7/2004 | Yamamoto | |
| 2005/0012277 A1 | 1/2005 | Adrion et al. | |
| 2006/0103075 A1 | 5/2006 | Zahn | |
| 2007/0290451 A1 * | 12/2007 | Yager | 277/551 |
| 2007/0296153 A1 * | 12/2007 | Kurth et al. | 277/309 |
| 2008/0203673 A1 * | 8/2008 | Kanzaki et al. | 277/402 |
| 2008/0217865 A1 * | 9/2008 | Sedlar et al. | 277/572 |
| 2008/0284110 A1 | 11/2008 | Dahlheimer | |
| 2008/0309024 A1 | 12/2008 | von Schemm | |
| 2009/0257699 A1 * | 10/2009 | Hosaka et al. | 384/486 |
| 2010/0187768 A1 | 7/2010 | Sedlar | |
| 2010/0187769 A1 | 7/2010 | Sedlar et al. | |
| 2010/0244390 A1 | 9/2010 | Berdichevsky et al. | |
| 2011/0018209 A1 * | 1/2011 | Dahlhaus-Preussler | 277/562 |

FOREIGN PATENT DOCUMENTS

| | | |
|---|---|---|
| JP | 04107580 | 9/1992 |
| JP | 6193741 | 7/1994 |
| JP | 2003269616 | 9/2003 |
| JP | 2006226489 | 8/2006 |
| JP | 2008075679 | 4/2008 |
| WO | 9008273 | 7/1990 |

\* cited by examiner

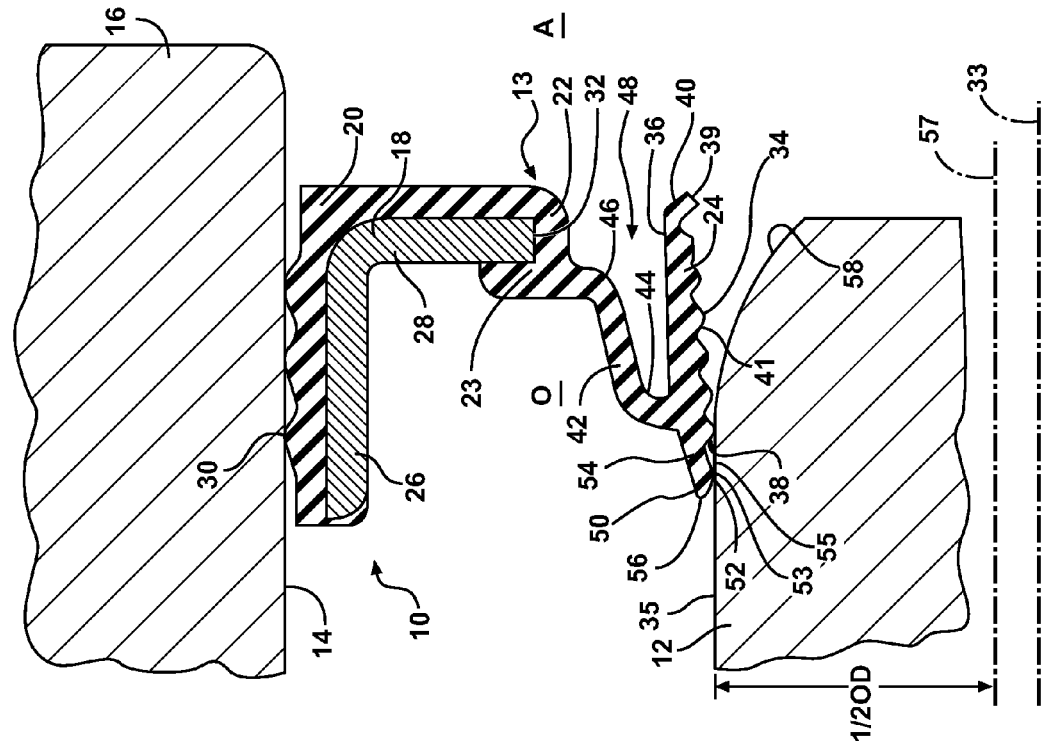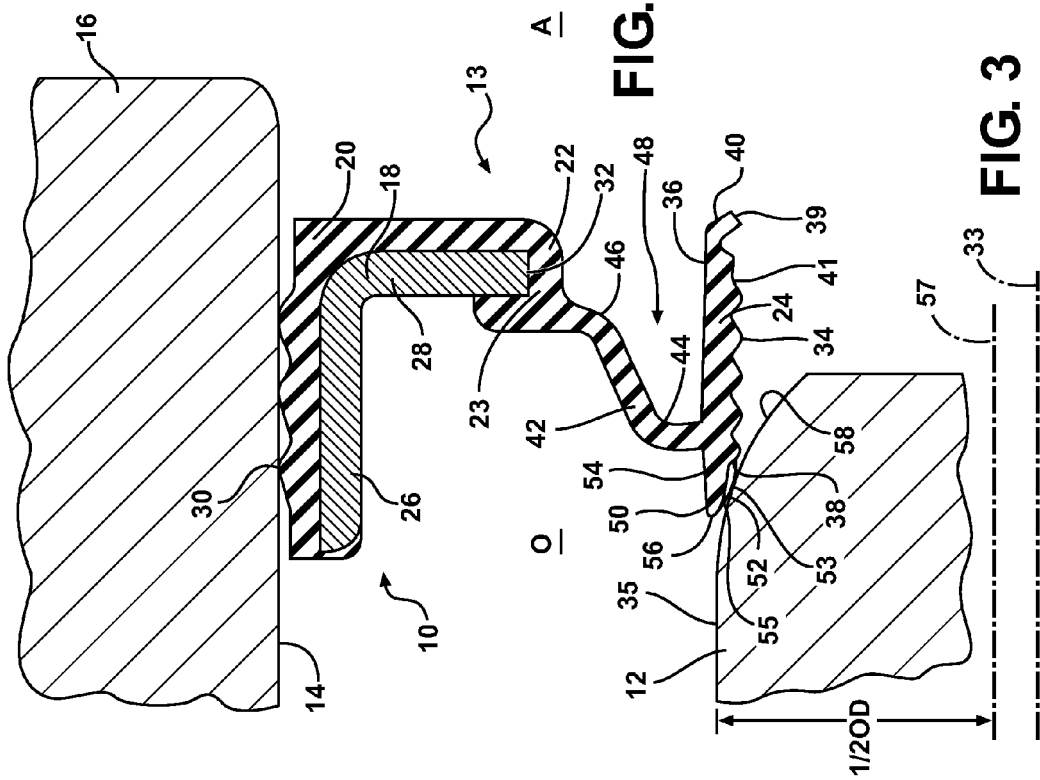

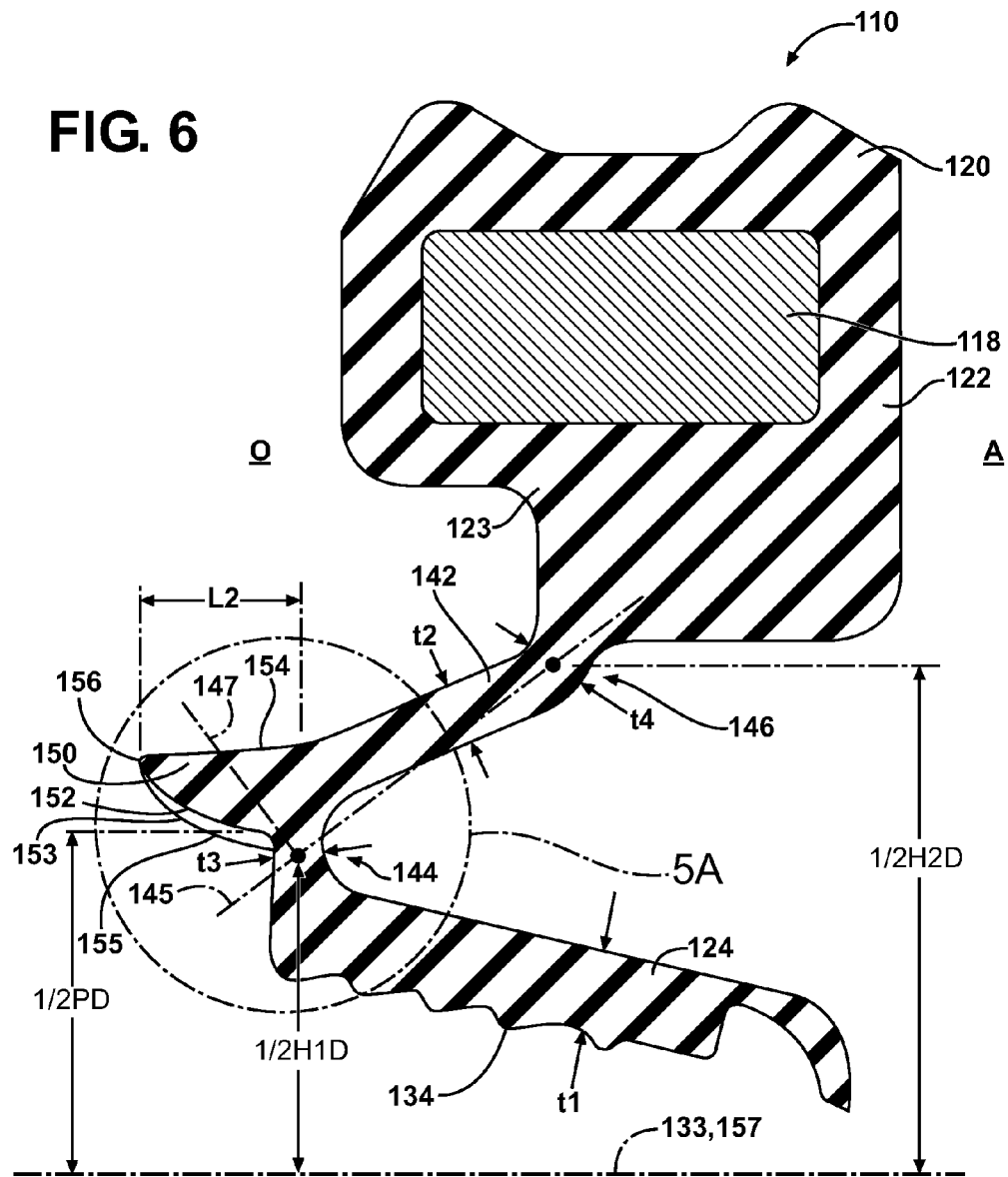

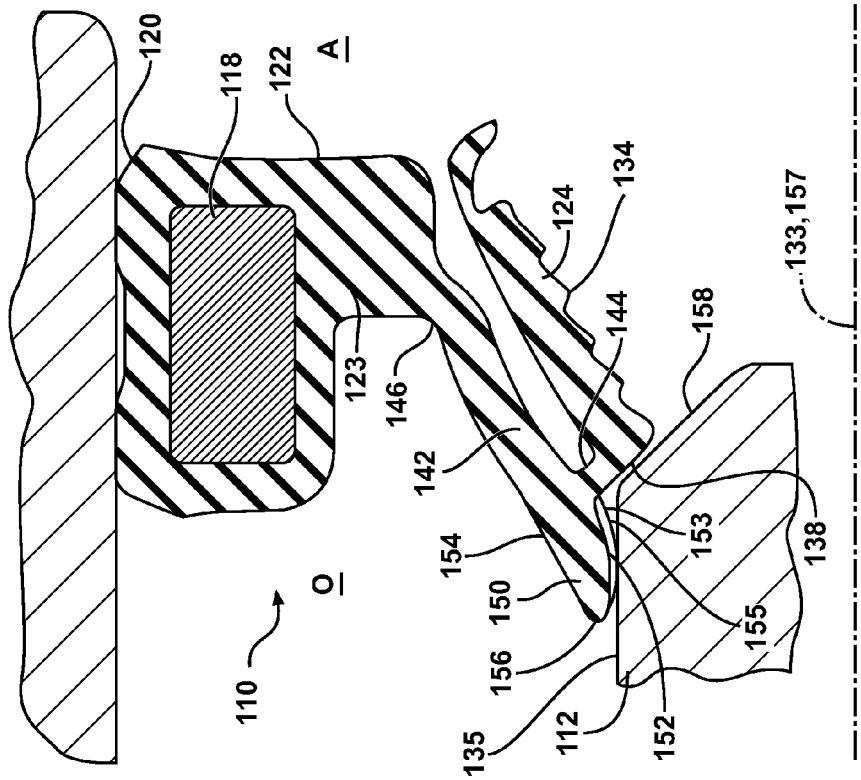
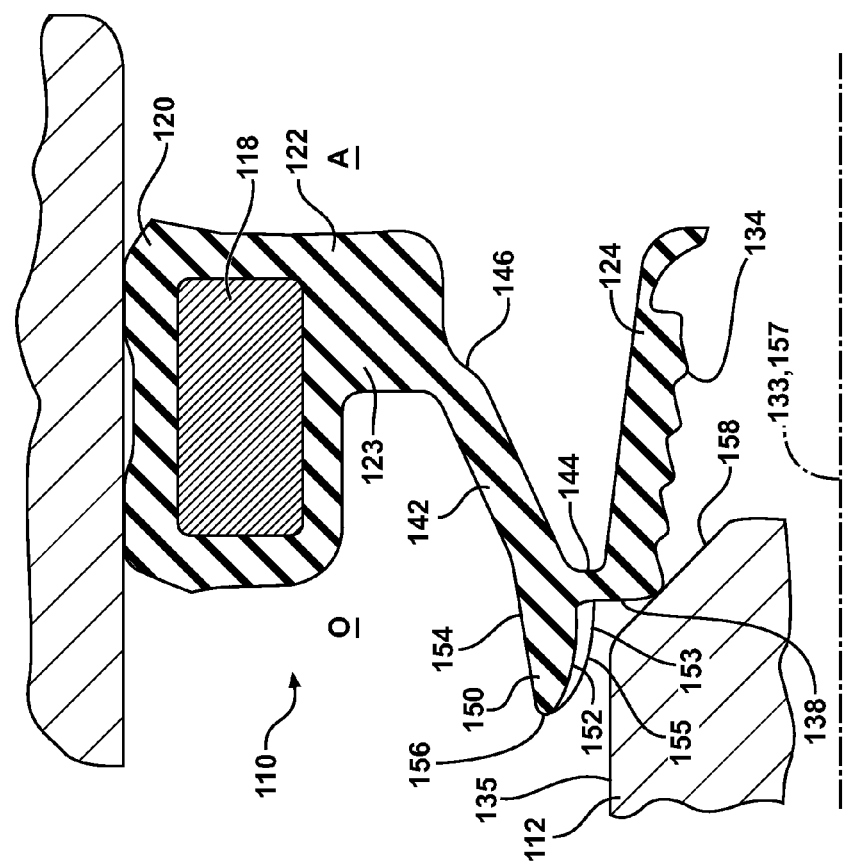

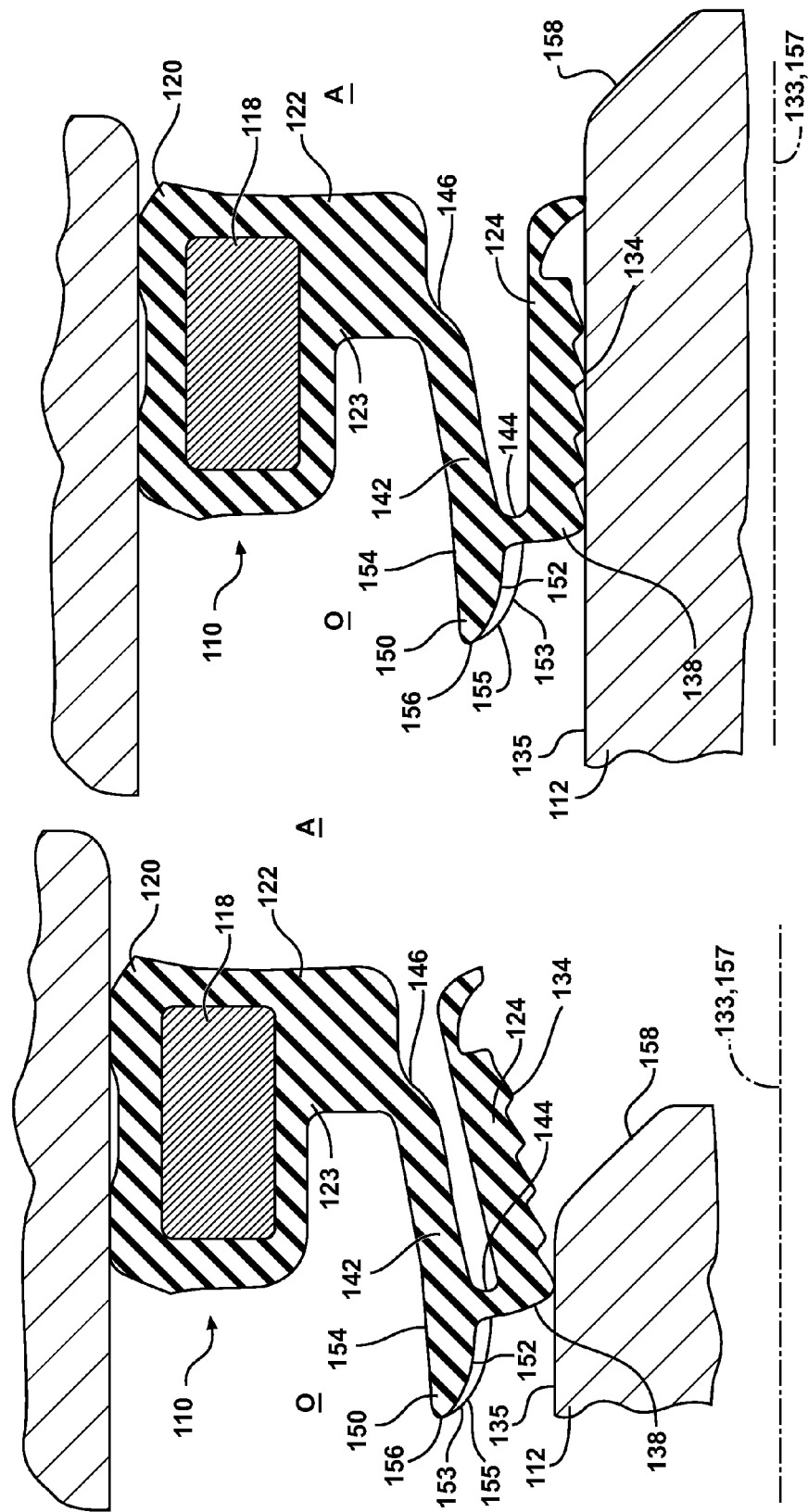

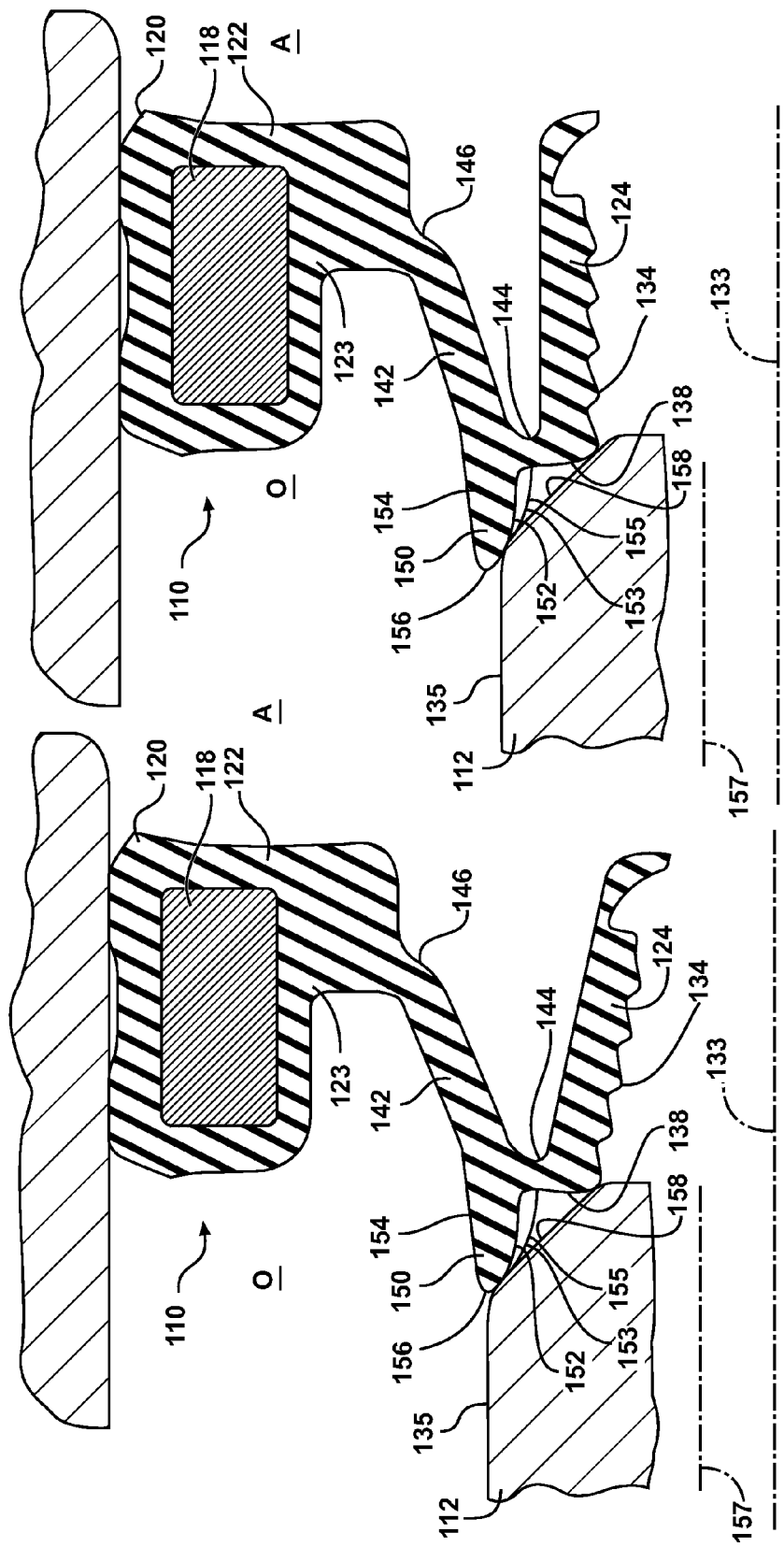

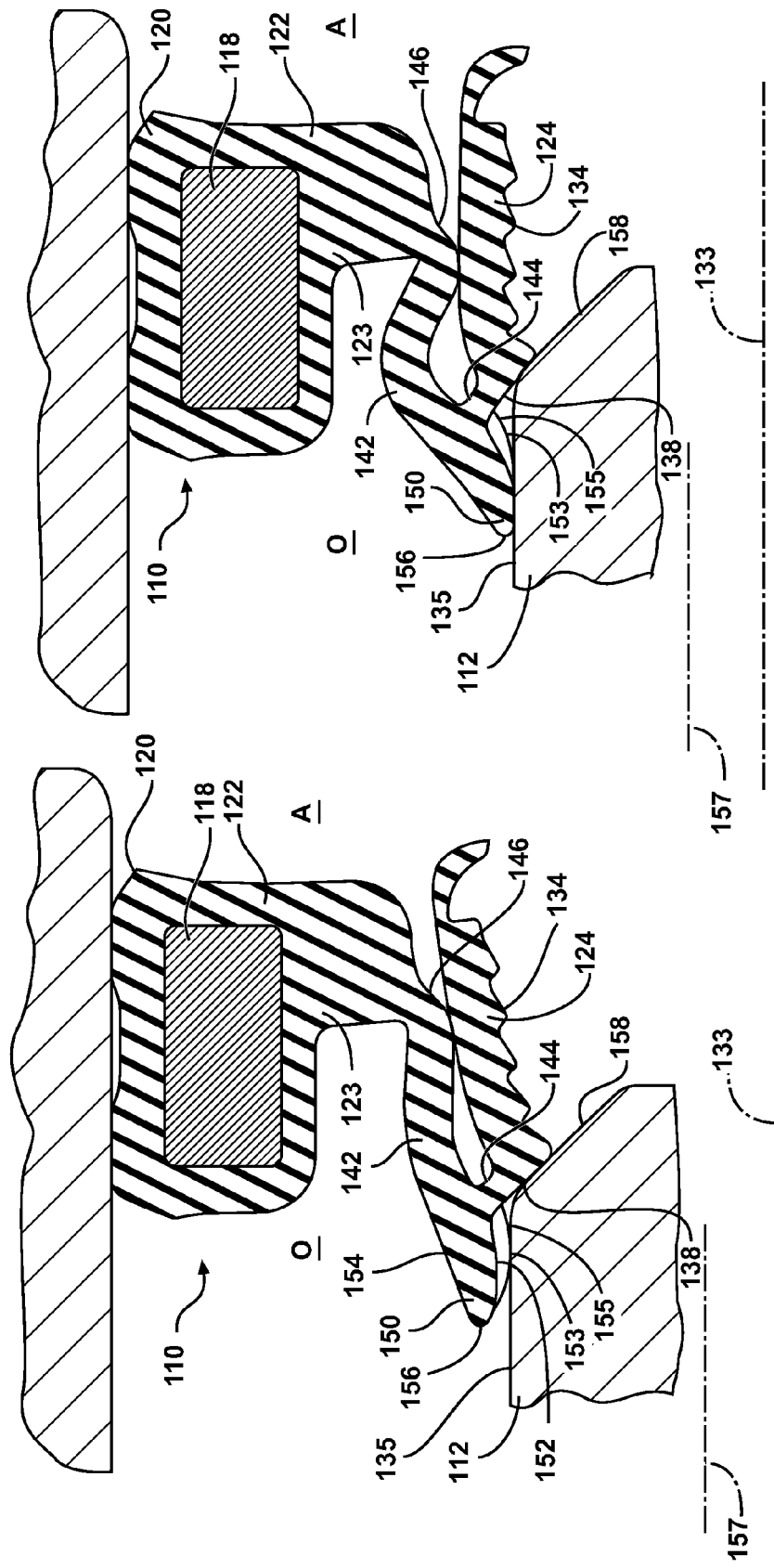

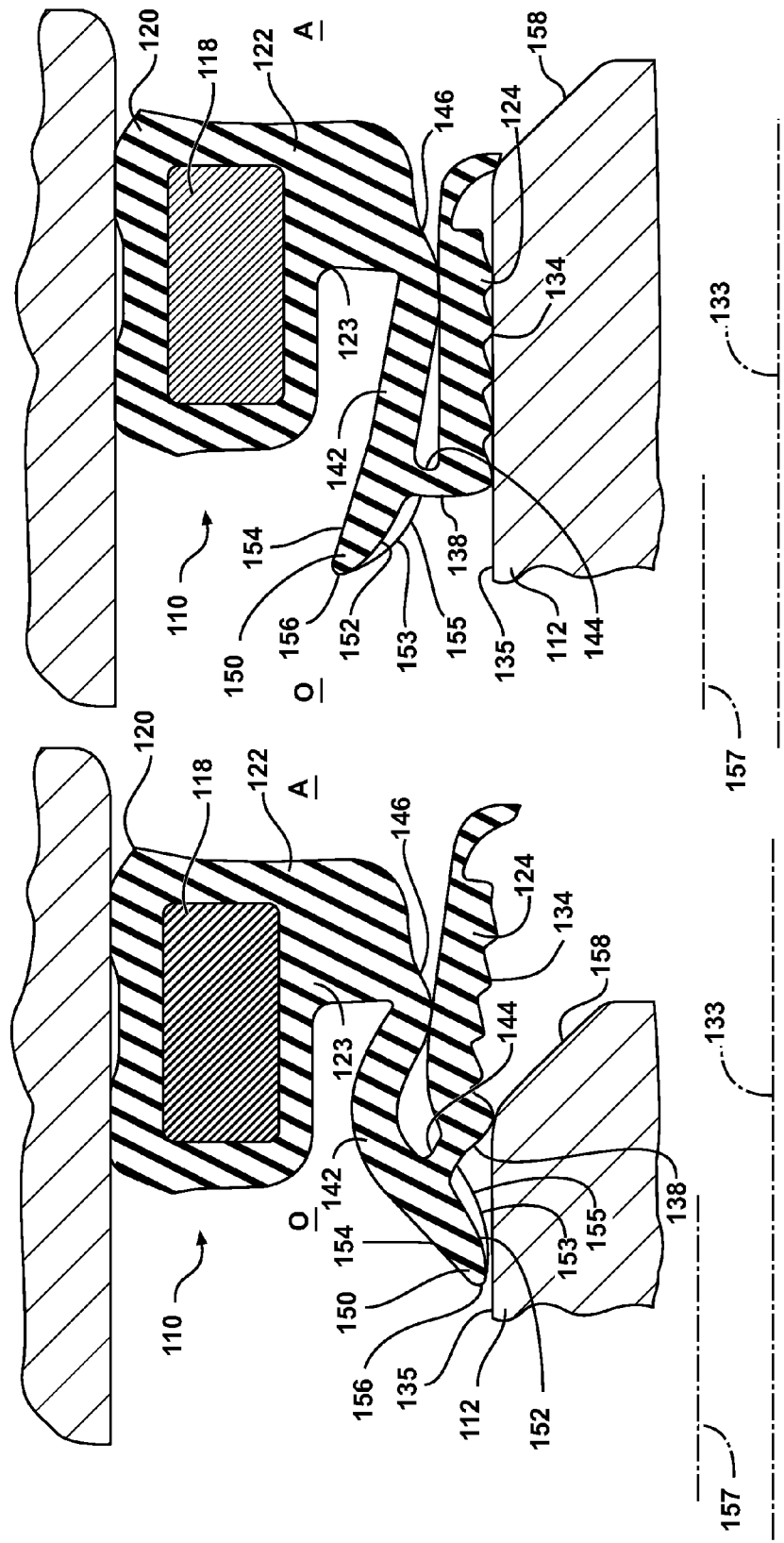

RADIAL SHAFT SEAL, RADIAL SHAFT SEAL ASSEMBLY AND METHOD OF INSTALLATION

BACKGROUND OF THE INVENTION

1. Technical Field

This invention relates generally to dynamic oil seals of the type for creating a fluid tight seal between a rotating shaft and a housing.

2. Related Art

Dynamic radial shaft oil seals are designed to have a so-called "oil side" of the seal and an "air side." These designations pertain to the orientation of the seal when installed, with the oil side facing the interior of the housing and in communication with the oil, whereas the air side faces outwardly and is exposed to the air.

There are at least two different ways in which a radial shaft oil seal can be installed. An "air side installation" is one in which the seal is first installed into the bore of the housing and the shaft (or its wear sleeve) thereafter installed from the air side axially into the seal assembly (in the direction inward of the housing) to effect the seal. An "oil side installation" is the other where the housing and shaft are already present and the seal assembly is slid axially into the housing and simultaneously onto the shaft (or its wear sleeve), such that the shaft enters the seal assembly from the oil side of the seal. Otherwise, "oil-side" installation requires the seal assembly to be installed into the housing, also referred to as carrier, and then the housing, with seal installed therein, is assembled to an engine over the "all ready in place" shaft.

During installation, regardless of the type, the seals must be able to withstand the axial loads resulting during installation without causing a seal lip of the seal to reverse fold or otherwise become displaced to a position where the seal lip is ineffective in the fully installed condition. The axial load imparted on the seal lip is largely due to the friction between the seal lip and an outer surface of the shaft as the two are moved axially relative to one another during installation. Accordingly, it is desirable to minimize the friction generated during installation of the shaft through the seal, however, a delicate balance needs to be maintained in order to attain the desired seal between the seal lip and the shaft.

SUMMARY OF THE INVENTION

In general terms, this invention provides a radial shaft seal assembly having features that facilitate making a proper oil side installation, even in conditions of shaft-to-bore misalignment, and further, provide support for a seal lip of the seal assembly against adverse seal-breaking movement when exposed to positive or negative pressure on an oil side of the seal assembly when installed.

In accordance with one presently preferred aspect of the invention, a radial shaft seal configured for receipt in a housing and about a shaft to sealingly isolate an air side of the shaft seal from an oil side of the shaft seal is provided. The radial shaft seal includes an annular mounting portion and a seal lip having an annular sealing surface extending between an oil side end and a free air side end, with the sealing surface being configured to extend axially relative to the shaft. Further, an annular bridge is connected to the oil side end of the seal lip by a first hinge and to the mounting portion by a second hinge. The bridge extends from the first hinge to the second hinge in radially overlying relation to the seal lip. A projection extends from the first hinge away from the bridge toward the oil side of the seal. The projection has a radially inwardly facing inner surface. A plurality of circumferentially spaced ribs extend radially inwardly from the inner surface of the projection. The projection and ribs prevent the seal lip from inverting during the oil-side installation process, thereby ensuring that the seal lip attains its proper sealing contact with a running surface during use.

In accordance with another aspect of the invention, a radial shaft seal assembly is provided. The radial shaft seal assembly includes a shaft extending along a central axis and providing a running surface with a predetermined diameter and a radial shaft seal configured for receipt in a housing and about the shaft to sealingly isolate an air side of the radial shaft seal from an oil side of the radial shaft seal. The radial shaft seal includes an annular mounting portion and a seal lip having an annular sealing surface and an opposite backing surface extending between an oil side end and a free air side end, with the sealing surface being configured to extend axially in dynamic sealing contact with the running surface. Further, an annular bridge is attached to the oil side end of the seal lip by a first hinge and to the mounting portion by a second hinge. The bridge extends from the first hinge to the second hinge in radially overlying relation to the seal lip. In addition, at least one projection extends axially from the first hinge toward the oil side of the seal. The projection has a radially inwardly facing inner surface. A plurality of circumferentially spaced ribs extend radially inwardly from the inner surface of the projection. The projection and ribs prevent the seal lip from inverting during the oil-side installation process, thereby ensuring that the seal lip attains its proper sealing contact with a running surface during use.

In accordance with another aspect of the invention, a method of installing a radial shaft seal onto a shaft is provided. The method includes providing a shaft having a running surface and providing the radial shaft seal with a seal lip having an annular sealing surface converging from an oil side end to a free air side end while in a free state. Further, providing the radial shaft seal with an annular bridge attached to the oil side end by a first hinge with the bridge diverging to a second hinge while in the free state. The second hinge being attached to an outer mounting portion such that the bridge extends in radially overlying relation with the seal lip. The radial shaft seal further including at least one projection extending axially from the first hinge toward an oil side of the seal. The projection has a radially inwardly facing inner surface, wherein a plurality of circumferentially spaced ribs are provided to extend radially inwardly from the inner surface. Then, moving the shaft and the radial shaft seal axially toward one another and bringing the oil side end of the seal lip into abutment with an end of the shaft. Further, bringing the ribs into contact with running surface of the shaft while substantially avoiding contact of the inner surface of the projection with the shaft and bringing the sealing surface into sealing engagement with the running surface while simultaneously moving the ribs out of contact with the running surface.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIGS. 3-5 are cross-sectional views of the seal of FIG. 1 shown disposed in a housing with a shaft being installed in progression from an oil-side of the seal;

FIG. 6 is a cross-sectional view of a radial shaft seal constructed according to another aspect of the invention;

FIGS. 7-12 illustrate cross-sectional views of the seal of FIG. 5 shown disposed in a housing with a shaft being installed in progression from an oil-side of the seal in co-axially aligned relation with the seal;

FIGS. 13-19 illustrate cross-sectional views of the seal of FIG. 6 shown disposed in a housing with a shaft being installed in progression from an oil-side of the seal in axially misaligned relation with the seal;

DETAILED DESCRIPTION OF PREFERRED EMBODIMENTS

Figure 1:
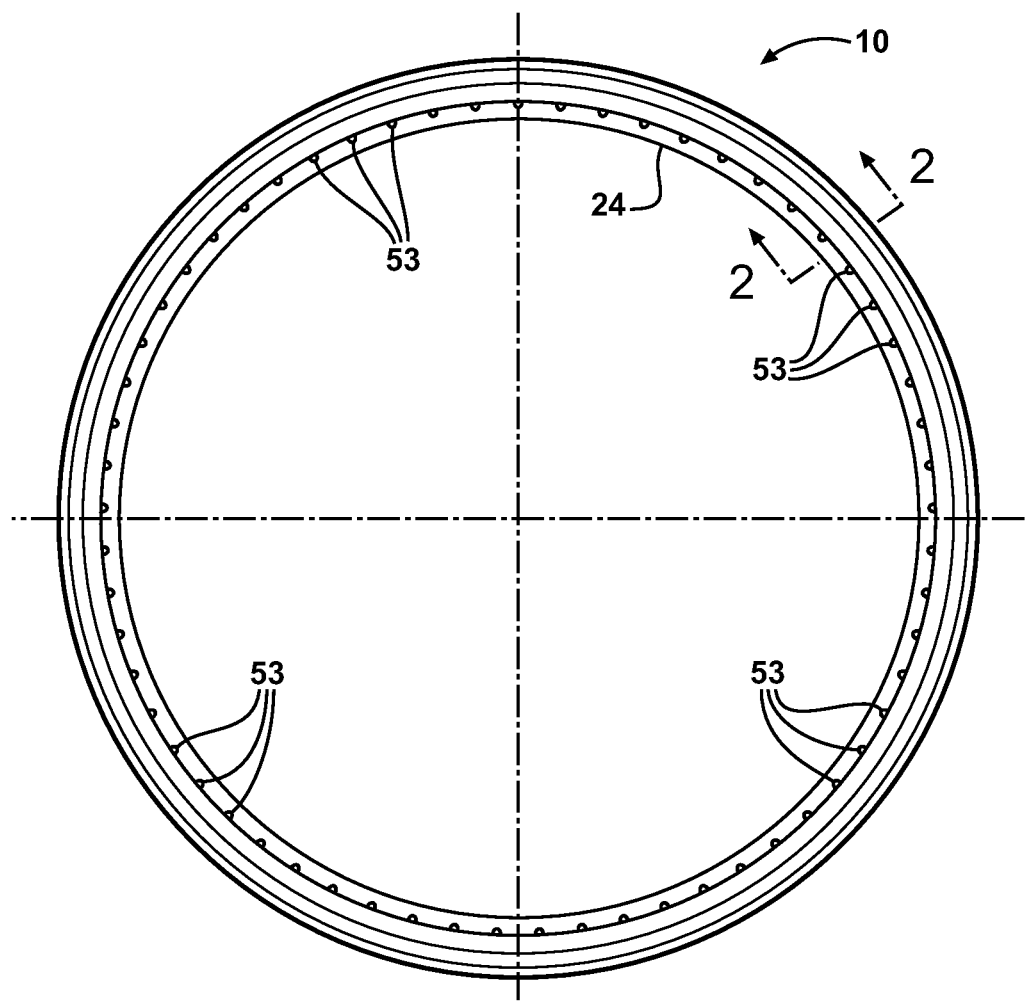
FIG. 1 is a plan view of a radial shaft seal constructed according to one aspect of the invention.
Figure 2:
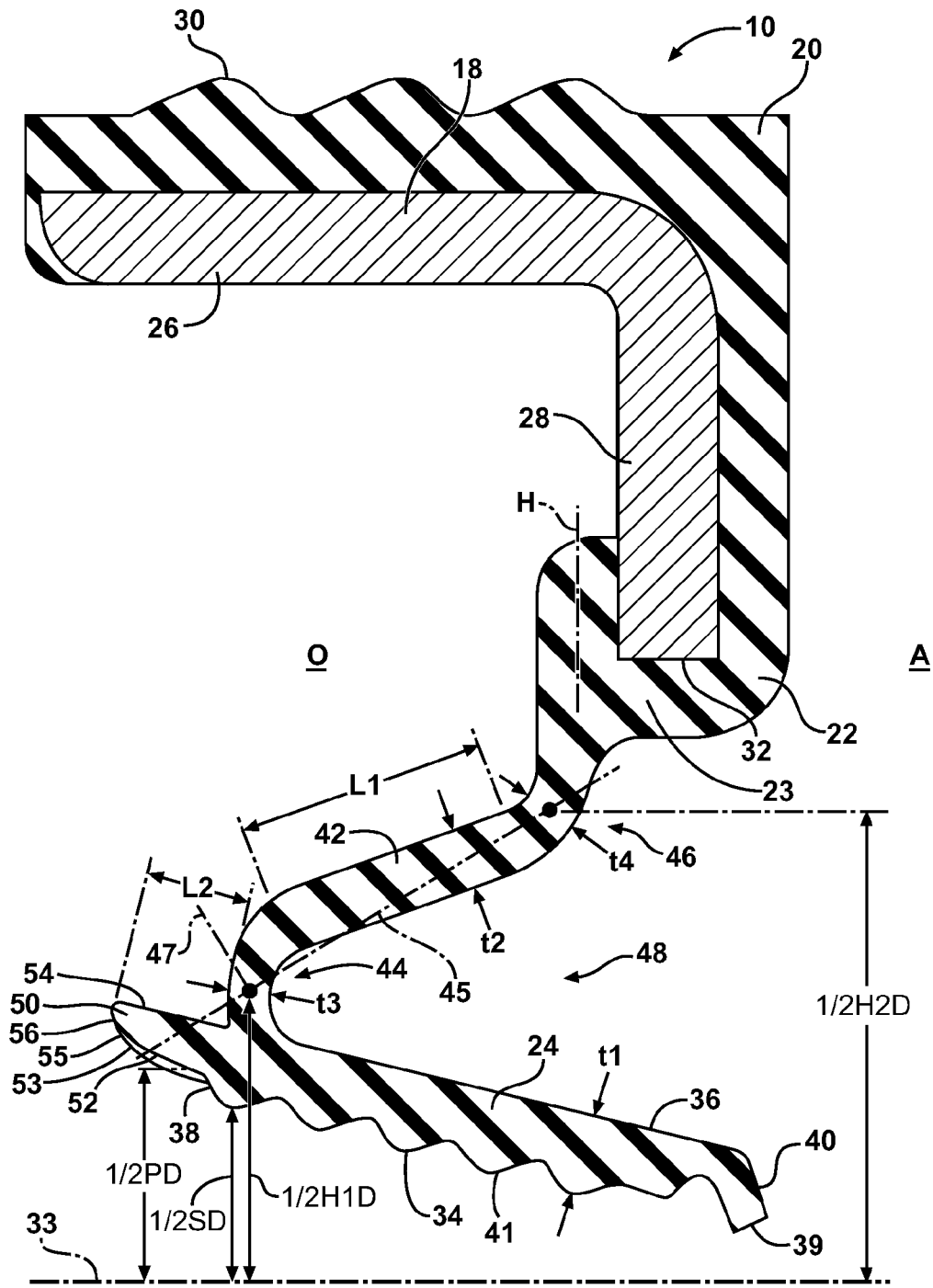
FIG. 2 is a cross-sectional view taken generally along the line 2-2 of FIG. 1.

Referring in more detail to the drawings, FIG. 1 illustrates a radial shaft seal, referred to hereafter as seal 10, constructed in accordance with one aspect of the invention, wherein the seal is suitable for use in a crankcase application, by way of example and without limitation, for sealing about a rotatable shaft 12 in a radial shaft seal assembly 13 (FIGS. 3-5) extending through a bore 14 in the crankcase 16 in which the seal 10 is installed. Otherwise, the seal 10 can be installed into a carrier housing, whereupon the carrier housing and seal 10 can be attached to the engine. With reference to FIG. 2, the seal 10 has an oil side O and an axially opposite air side A, in relation to the orientation of the seal 10 when installed, with the oil side O facing to the interior of the crankcase 16 and the air side A facing to the outside environment. The seal 10 includes a mounting portion, such as a case, also referred to as core or collar 18, provided as a metal annulus or ring structure with an elastomeric seal material 20 attached thereto. The seal material 20 forms at least part of the an elastomeric seal body 22 with an axially extending seal lip 24 that exhibits low dynamic frictional contact with the shaft 12 during use, thereby resulting in a low torque between the shaft 12 and the seal lip 24, such as between about 0.07-0.35 N*m (Newton meters), as newly installed, during and upon use. Accordingly, as a result of the minimal frictional losses exhibited by the seal 10, the losses in efficiency of the engine are kept to a minimum.

The annular metal collar 18 may be L-shaped, as illustrated, or may take on any number of configurations, such as ring-shaped, C-shaped or S-shaped, depending upon the requirements of a particular application, as is know in the art. The L-shaped collar 18 has a cylindrical outer wall 26 and a radially inwardly extending leg 28. The metal reinforcing ring structure 18 is shown covered at least in part with the elastomeric seal material 20 on a radially outwardly facing surface of the outer wall 26 which may be contoured with undulations 30 to provide a snug and fluid tight installation in the bore 14 of the crankcase 16. The elastomeric seal material of the seal body 22 extends along the radially inwardly extending leg 28 of the metal core 18 on the air side A of the leg 28 and extends around an inner end 32 to cover a portion of the oil side O of the leg 28 to provide a central portion 23 of the seal body 22 radially inward from the leg 28. The core 18 and seal body 22 are relatively rigid, yet the seal material 20 is sufficiently resilient to form the seal lip 24.

The seal lip 24, when in the relaxed, uninstalled state (FIG. 2), extends in a slightly inclined orientation, such as between about 1-10 degrees from a horizontal central axis 33 of the seal 10, and has an annular, radially inwardly facing sealing surface 34 and an opposite, radially outwardly facing backing surface 36 extending between an oil side end 38 and a free air side end 40. The sealing surface 34, while in its free state, has a maximum diameter SD at the oil-side end 38 that is less than an outer diameter OD of a running surface 35 of the shaft 12 (FIGS. 3-5), and thus, the entire sealing surface 34 is assured of being brought into sealing engagement with the running surface 35 upon completing installation assembly and while in use. The sealing surface 34 can be configured having hydrodynamic features 41 in the form of ribs or a thread, that act to pump oil back to the oil side O of the seal 10 during rotation of the shaft 12. Further, the air side end 40 can be provided with a dust exclusion lip 39 that facilitates prevention of contamination ingress from the air-side A to the oil-side O of the seal assembly 10, and further, facilitates maintaining the lubricant on the oil-side O of the assembly 10. The seal lip 24 is formed having a predetermined thickness t1 (shown only in FIG. 1 to avoid cluttering the Figures, as with other dimensional features discussed hereafter) to facilitate maintaining the low-torque seal against the shaft 12, as is discussed in more detail below.

An annular bridge 42 operably connects the seal lip 24 to the seal body 22. The annular bridge 42 is connected to the oil side end 38 of the seal lip 24 by a first hinge 44 and to the central portion 23 of the mounting portion 18 by a second hinge 46. The bridge 42 extends over a length L1 generally along an imaginary line 45 that extends between and through the hinges 44, 46 at an angle to the horizontal central axis 33, such as between about 20-40 degrees, though the angle can range from 1-89 degrees from horizontal. The second hinge 46 transitions to an orientation that is about parallel with the radial leg 28 of the mounting portion 18 and about perpendicular to a horizontal axis H of the seal 10. The bridge 42 extends from the first hinge 44 to the second hinge 46 in radially overlying relation to the seal lip 24, and thus, provides an annular pocket 48 facing the air-side A of the seal assembly 10. The bridge 42 is constructed having a thickness t2, while the first and second hinges 44, 46 are constructed having respective thickness t3, t4. The relative thicknesses are preferably such that t1≥t3; t2≥t3, and t2≥t4, and more preferably, t1>t3; t2>t3, and t2>t4. In addition, while in the free state, the first hinge 44 has a first diameter H1D and the second hinge 46 has a second diameter H2D, wherein H1D<H2D.

The seal 10 further has a projection 50, that extends generally from the first hinge 44 axially away from the seal lip 24 and the bridge 42 toward the oil side O of the seal 10. The projection 50 is configured to aid in the oil-side installation, discussed further below, to prevent the seal lip 24 and bridge 42 from unfolding during installation. Further, the projection 50 is configured to remain out of contact with the shaft running surface 35 upon installation and during use. In the event the oil side O experiences a pressure change, such as a negative pressure (relative vacuum), the pressure differential across the seal exerts an axially inward force on the seal 10, whereupon the projection 50 acts at least in part to stiffen the seal lip 24, and thus, acts to prevent the seal lip 24 from lifting out of sealing contact from the shaft running surface 35. The projection 50 has a main thickness extending between a radially inwardly facing inner surface 52 and a radially outwardly facing outer surface 54 that is sufficient to substantially retain its shape and geometry during installation without allowing the projection 50 to roll back or under itself. To facilitate smooth installation, the inner surface 52 is shown to gradually taper radially outwardly toward a radially outermost free end 56, and is further shown as having a convex contour, by way of example and without limitation. To further facilitate smooth installation, a plurality circumferentially spaced skids, also referred to as projection ribs, skid ribs or ribs 53, extend axially along the inner surface 52 between the seal lip 24 and the free end 56, shown as tapering gradually toward the free end 56. The ribs 53 are preferably spaced equidistant from one another about the circumference of the seal lip 24 and extend radially inwardly from the inner surface 52 a predetermined distance to relatively narrow contact edges 55 that function as "low friction" skids during installation. By "low friction", what is meant is that the friction between the projection 50 and the shaft 12 would be increased if the ribs 53 were not present. As mentioned, the ribs 53 remain out of contact with shaft running surface 35 upon installation and during use. Accordingly, the inner surface 52 and ribs 53 have a minimum diameter PD that is at least slightly greater than the inner diameter SD of the sealing surface 34 of the seal lip 24, and thus, as mentioned, upon assembly on the shaft 12, the inner surface 52 and ribs 53 remain spaced radially outwardly, and out of contact, from the running surface 35. The projection 50 has a length L2 that extends generally from the first hinge 44 and/or the oil-side end 38 of the seal lip 24 that is sufficient to counter any forces tending to invert bridge 42, wherein the length L2 is less than the length L1 of the bridge 42. The ribs 53 extend along the entire or substantially the entire length L1 of the projection 50. As such, the projection 50 acts primarily during installation as an aid to prevent the seal lip 24 from attaining an other than proper configuration on the shaft 12, while the ribs 53 prevent the full inner surface of the projection 50 from contacting the shaft. As such, the ribs 53 reduce the amount of contact with the shaft 12, and thus, reduce the friction generated against the shaft 12 during installation, thereby further preventing the seal lip 24 from inverting. As further shown in FIG. 2, the projection 50 is formed substantially above the imaginary line 45, which further enhances the ability of the projection 50 and ribs 53 to function as an "anti-inversion" feature for the seal bridge 42. In addition, the projection 50 and ribs 53 extend axially inwardly toward the oil-side O from an imaginary line 47 extending perpendicular to the imaginary line 45 through the first hinge 44.

Figure 5:
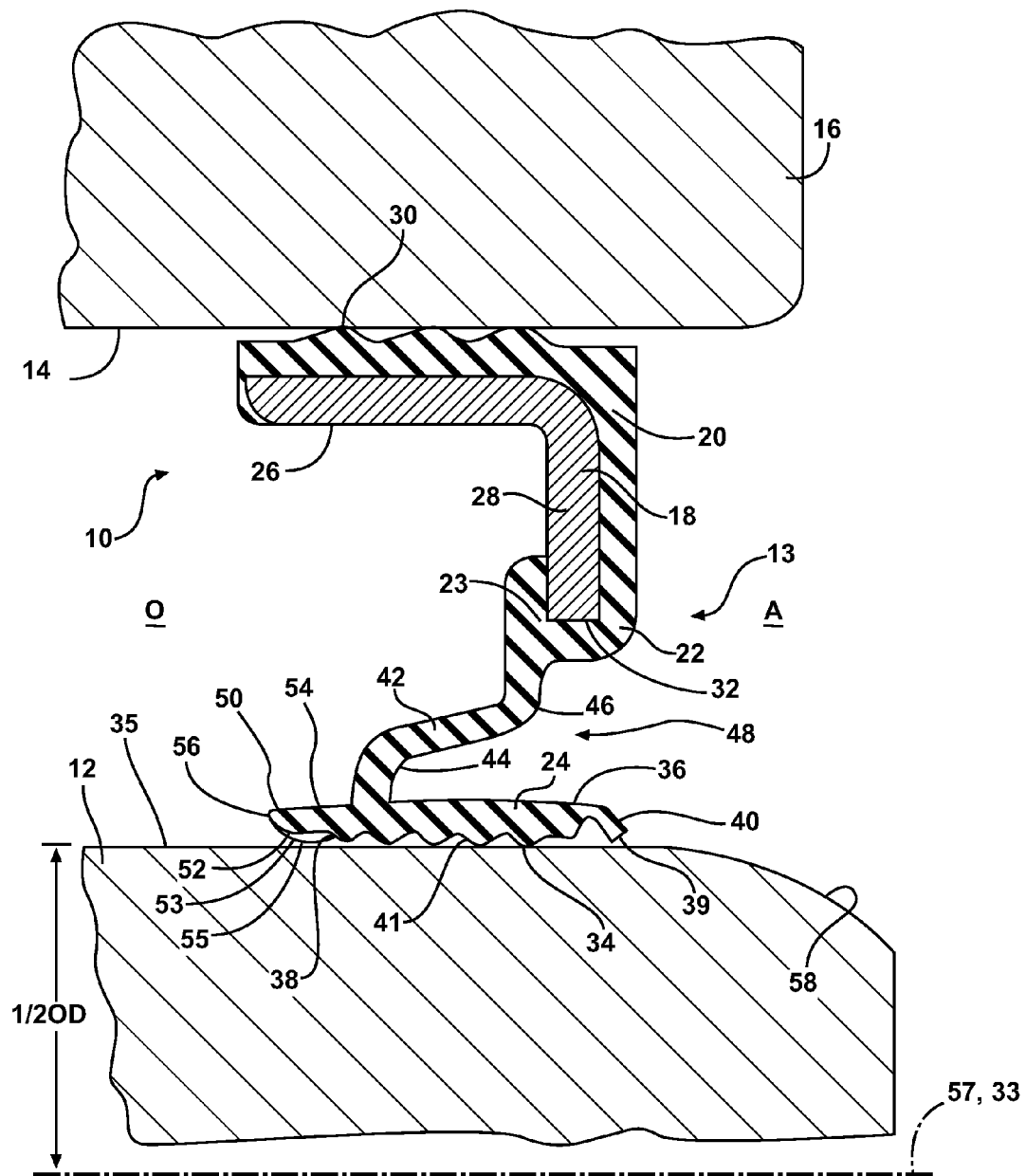
Figure 10:
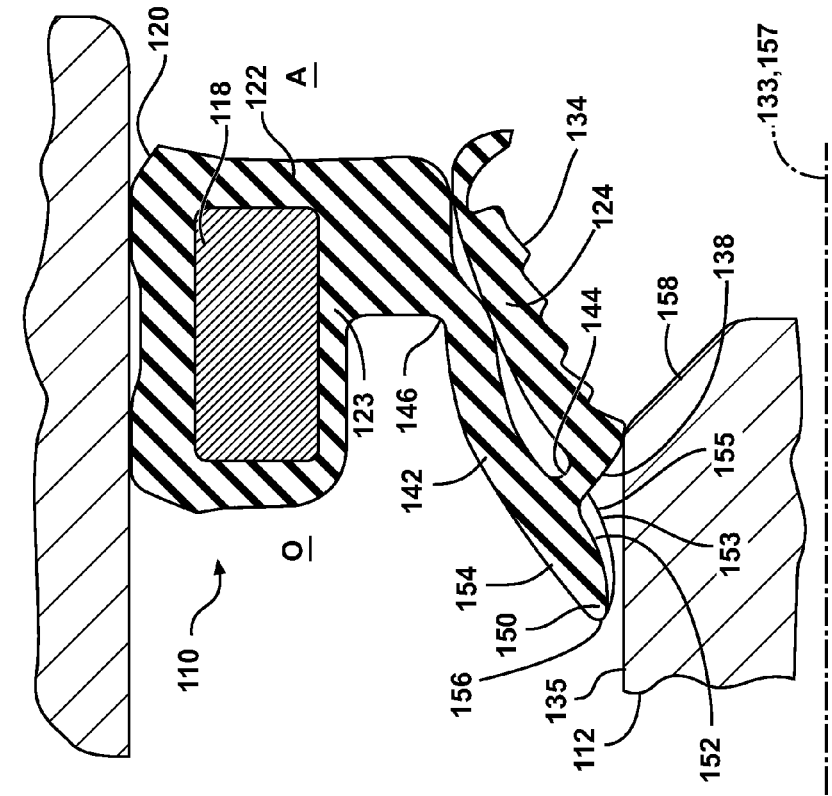
Figure 9:
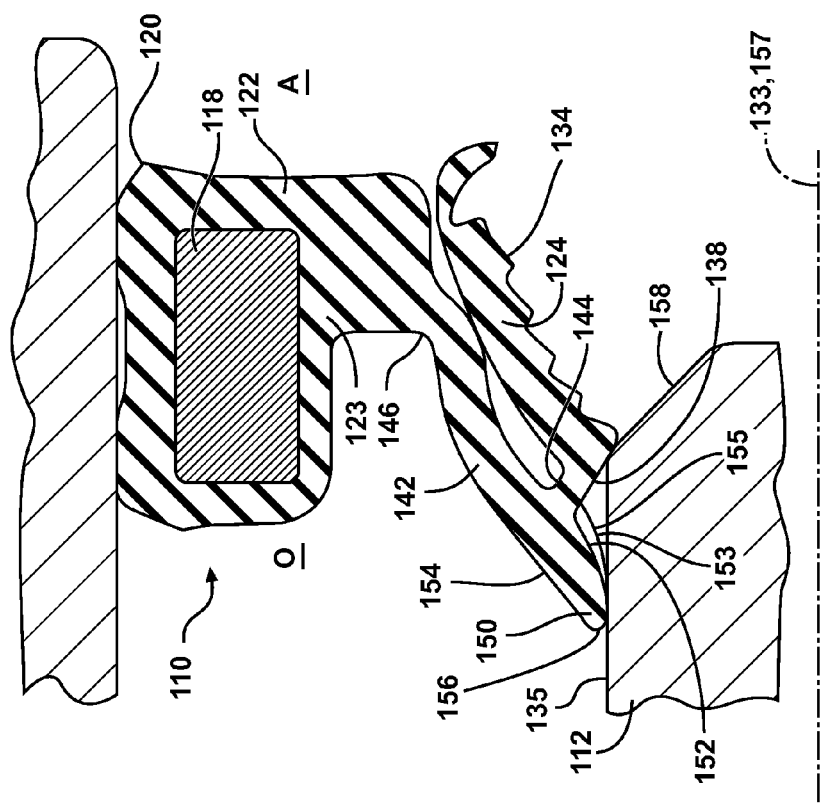

FIGS. 3-5 illustrate an oil-side installation progression of the shaft 12 through the seal 10, wherein a central axis 57 of the shaft 12 is slightly misaligned with the central axis 33 of the seal 10 (FIGS. 3-4) and then coaxially aligned in FIG. 5. In this installation, the seal 10 is already installed into the housing 16, with the shaft 12 thereafter being extended into the bore 14 and through the seal 10. As the shaft 12 is slid axially into the bore 14, an end 58 of the shaft 12 initially engages at least some of the contact edges 55 of the projection ribs 53. To facilitate assembly, the end 58 of the shaft 12 is configured to provide a lead-in tapered surface 60. With the shaft 12 and seal 10 being axially misaligned, it should be recognized that the diametrically opposite sides (not shown) of the seal and shaft are shifted relative to one another accordingly, and thus, a slight gap could result initially between the shaft 12 and projection ribs 53. As shown in FIG. 4, as the shaft 12 progresses axially though the seal 10, the contact edges 55 of the ribs 53 remain in contact with the shaft 12 as they slide over the shaft tapered lead-in surface 60 onto the running surface 35. As this is occurring, the main seal lip 24 is caused to expand radially outwardly and the air-side end 40 of the seal lip 24 is caused to pitch radially outwardly, such that the pocket 48 is caused to partially collapse, thereby reducing the axial installation force required to install the seal 10 about the shaft 12. As such, the projection 50 and the ribs 53 act to bring the seal lip 24 into axial alignment with the shaft 12. In addition, aside from bringing the seal lip 24 into axial alignment with the shaft 12, the projection 50, having its predetermined length L2, acts as a lever arm to counter any torsion forces generated between the seal 10 and the shaft 12 from acting on the bridge 42, while the circumferentially spaced ribs 53 act to prevent the inner surface 52 of the projection 50 from contacting the shaft 12. Thus, the amount of friction generated against the shaft 12 is minimized, thereby preventing the bridge 42 from being rolled and inverted axially outwardly toward the air-side A of the seal 10. Accordingly, as shown in FIG. 5, upon full installation of the shaft 12 through the seal 10, the seal lip 24 attains its proper sealing configuration with the running surface 35 of the shaft 12, while the projection 50 and the contact edges 55 of the ribs 53 remain spaced radially outwardly from contact with the shaft running surface 35.

FIG. 6 illustrates a seal 110 constructed in accordance with another aspect of the invention, with FIGS. 7-12 illustrating the seal 110 being installed in an oil-side installation progression on a shaft 112, wherein the same reference numerals as used above, offset by a factor of 100, are used to identify similar features as discussed above. As discussed above, the seal 110 has a mounting portion, shown here, by way of example and without limitation, as having a rectangular metal reinforcing ring structure 118 in cross-section and an elastomeric seal material covering 120, wherein the covering 120 is shown as being molded to encapsulate the ring structure 118. Similarly as discussed above, the material covering 120 is shown having an outer contoured surface with radially outwardly facing ribs for snug and fluid tight installation in a bore 114 of a housing 116.

The elastomeric seal material 120 provides a seal body 122 that extends radially inwardly of the core 118 to a central vertically extending body portion 123. Similarly as in the seal 10 discussed above, the seal 110 has a seal lip 124 and a bridge 142 with a first hinge 144 connecting the seal lip 124 to the bridge 142 and a second hinge 146 connecting the bridge 142 to the central portion 123 of the seal body 122. The relative thicknesses (FIG. 6) of the seal lip t1; bridge t2 and the first and second hinges t3, t4, respectively, are as discussed above. Further, the relative diameters H1D, H2D of the first and second hinges 144, 146 also remain as discussed above. Accordingly, thus far, other than the configuration of the mounting portion 118, the seal 110 is the same as the seal 10.

The notable distinction between the seal 110 and the previously discussed seal 10 can be seen with the location of a projection 150 and its associated ribs 153 on the seal 110. With regard to the seal 110, the projection 150 and the ribs 153 extend from a more radially outward location than the previously discussed projection 50 and ribs 53, however, the projections 50, 150 and ribs 53, 153 remain similarly shaped. Thus, the projection 150 and ribs 153 extend generally from the first hinge 144 axially away from the seal lip 124 and the bridge 142 toward the oil side O of the seal 110, however, in contrast to the previous embodiment, they extend entirely or substantially entirely radially outwardly relative to the first hinge 144. As with the previously discussed projection 50, the projection 150 has a thickness extending between an inner surface 152 and outer surface 154 that is sufficient to substantially retain its shape and geometry during installation without allowing the projection 150 to roll under or back on itself.

To facilitate smooth installation, the inner surface contact edges 155 of the ribs 153 are gradually tapered to diverge radially outwardly, and are further shown as having a convex contour extending radially outwardly to or immediately adjacent to a free end 156 of the projection 150. The inner surface 152 and contact edges 155 have a minimum diameter PD that is at least slightly greater than the inner diameter of a sealing surface 134 of the seal lip 124, and thus, as discussed above with regard to the projection 50, and ribs 53, upon assembly on the shaft 112, the inner surface 152 and contact edges 155 are spaced radially outwardly out of contact from the shaft running surface 135. The projection upper or radially outwardly facing outer surface 154 extends in a smooth transition from the bridge 142 a sufficient length L2 to counter any forces tending to invert bridge 142, wherein the length L2 is less than the length L1 of the bridge 142. As such, as with the projection 50 discussed above, the projection 150 and ribs 153 extending therealong act primarily during installation to prevent the seal lip 124 from attaining an other than proper configuration on the shaft 112. Further, even more so than the projection 50, the projection 150 and ribs 153 are formed entirely above an imaginary line 145 extending between the first and second hinges 144, 146, which further enhances the ability of the projection 150 to function as an "anti-inversion" lever arm feature for the seal bridge 142. In addition, the projection 150 extends axially inwardly toward the oil-side O from an imaginary line 147 extending perpendicular to the imaginary line 145 through the first hinge 144. As discussed above, the dimensional aspects of the projection 150, including its inside diameter, thickness and length provide its ability to prevent the bridge 142 from becoming inverted during assembly.

FIGS. 7-12 illustrate an oil-side installation progression of the shaft 112 through the seal 110, wherein a central axis 157 of the shaft 112 is coaxially aligned with the central axis 133 of the seal 110. In this installation, the seal 110 is already installed into the housing 116, with the shaft 112 thereafter being extended into the bore 114 and through the seal 110. As the shaft 112 is slid axially into the bore 114, a tapered end 158 of the shaft 112 initially engages the oil-side end 138 of the seal lip 124. This occurs because the radially inwardly facing inner surfaces of the projection ribs 153, having a larger diameter than the shaft 112, are radially outward from the shaft 112, and thus, do not make initial contact with the shaft 112. The engagement of the end 138 of the seal lip 124 with the end 158 of the shaft 112 causes the seal lip 124 to pitch radially outwardly, such that the pocket 148 is caused to partially collapse, while simultaneously causing the projection 150 to pitch radially inwardly. The pitching motions are free to continue until the contact edges 155 of the ribs 153 engage the outer surface of the shaft 112, whereupon the stiffness of the projection 150 substantially prevents any further pitching. As such, the narrowly profiled contact edges 155 are caused to slide with minimal contact and frictional engagement along the shaft 112, as shown in the series of progression views, until the sealing surface 134 is fully received on the shaft 112, at which time, the contact edges 155 of the ribs 153 move out of contact from the shaft 112 and remain out of contact with the shaft 112 during use.

Figure 19:
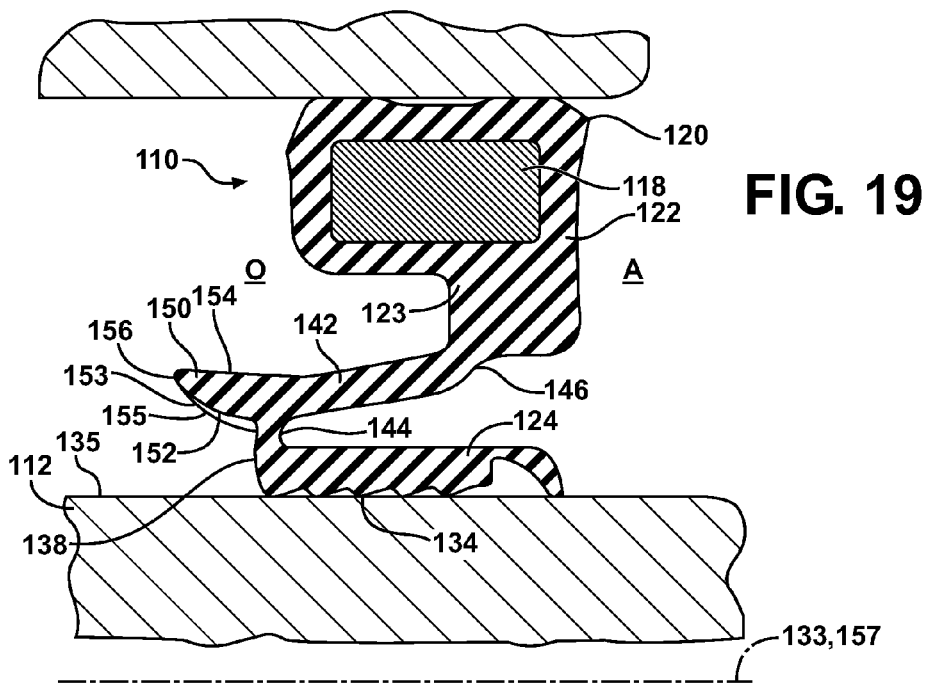

FIGS. 13-19 illustrate an oil-side installation progression of the shaft 112 through the seal 110 that follows the same progression as described for FIGS. 6-11, however, the central axis 157 of the shaft 112 is axially misaligned with the central axis 133 of the seal 110. As the shaft 112 is slid axially into the bore 114, a tapered end 158 of the shaft 112 initially engages at least some of the ribs 153, which slide along the tapered end 158 until they contact the running surface 135 and the end 138 of the seal lip 124 engages the end 158 of the shaft 112. The engagement of the end 138 of the seal lip 124 with the end 158 of the shaft 112 causes the seal lip 124 to pitch radially outwardly, such that the pocket 148 is caused to partially collapse, while simultaneously causing the projection 150 to pitch radially inwardly with the ribs 153 maintaining contact with the running surface 135. The ribs 153 are caused to slide along the shaft 112, as shown in the series of progression views, and when the seal lip 124 is fully received on the shaft 112, the ribs 153 move radially outwardly with the projection 150 such that they remain out of contact from the shaft 112, as shown in FIG. 19

Figure 20:
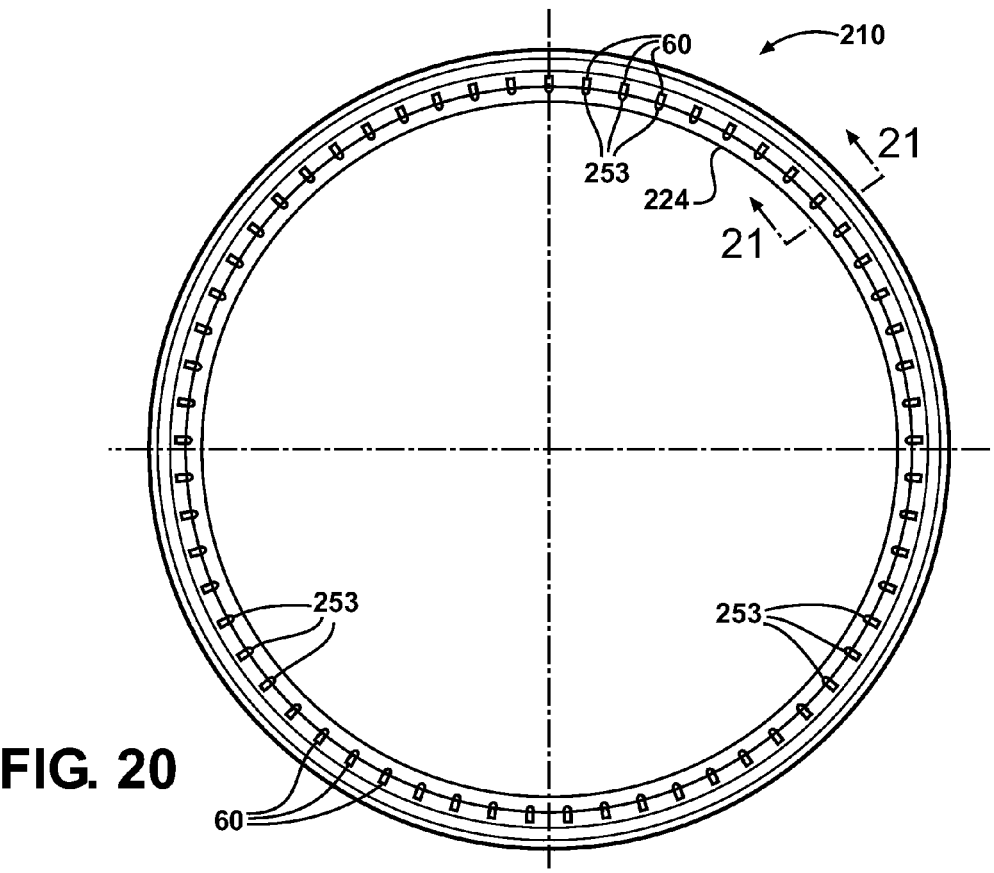
FIG. 20 is a plan view of a radial shaft seal constructed according to another aspect of the invention.
Figure 21:
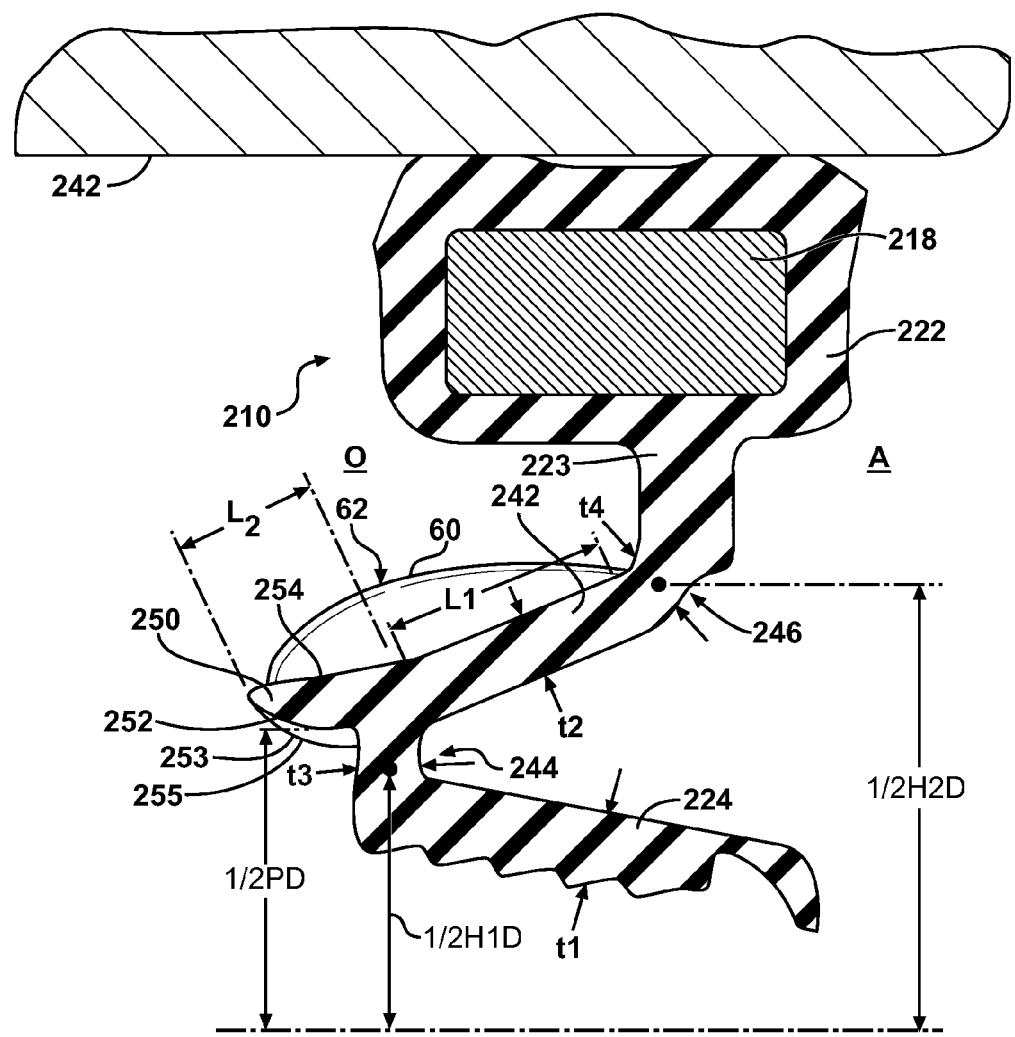
FIG. 21 is a cross-sectional view taken generally along the line 21-21 of FIG. 20.
Figure 22:
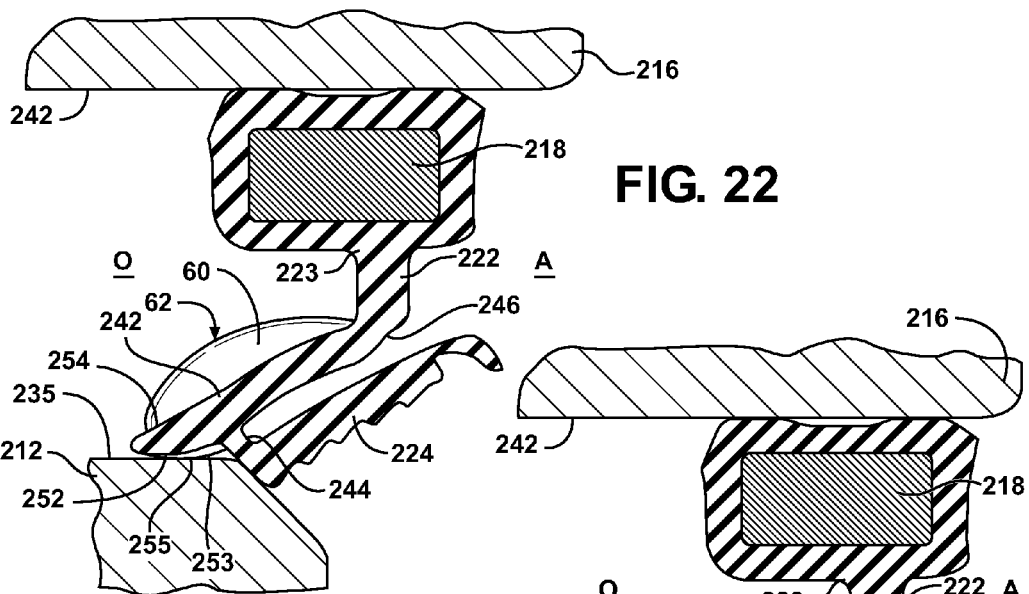
FIGS. 22-24 are cross-sectional views of the seal of FIG. 20 shown disposed in a housing with a shaft being installed in progression from an oil-side of the seal.
Figure 23:
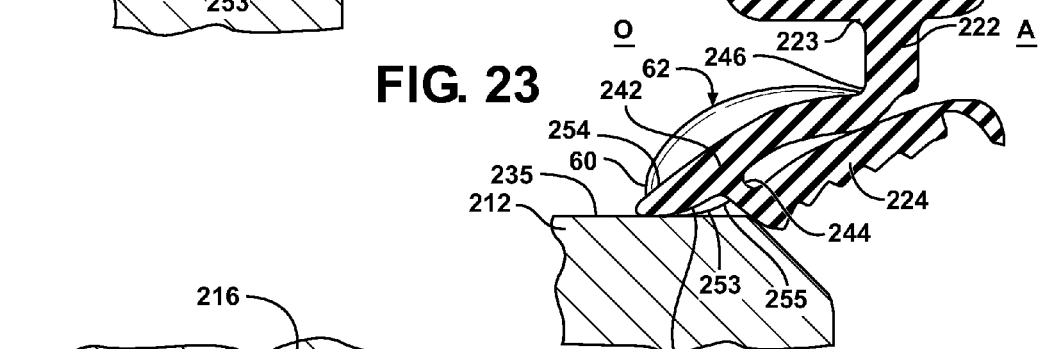
Figure 24:
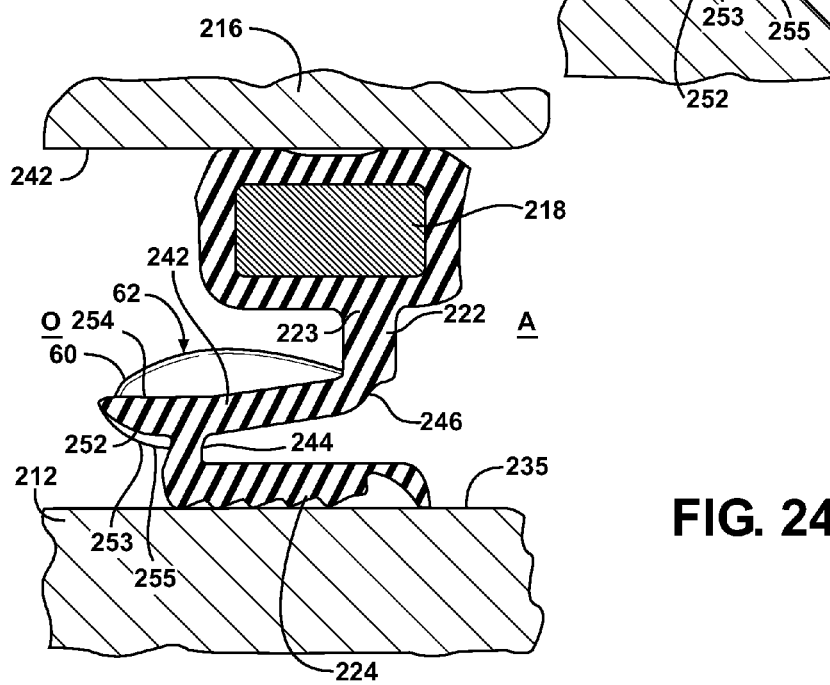

FIGS. 20 and 21 illustrate a seal 210 constructed in accordance with another aspect of the invention, with FIGS. 22-24 illustrating the seal 210 being installed in an oil-side installation progression on a shaft 212, wherein the same reference numerals as used above, offset by a factor of 200, are used to identify similar features as discussed above. The seal 210 is constructed generally the same as discussed above with regard to FIG. 6, including a mounting collar 218 contoured with radially outwardly facing ribs for snug and fluid tight installation in a bore 242 of the crankcase housing 216. Further, a seal body 222 extends radially inwardly from the core 218 to a central vertically extending body portion 223. The seal 210 has a seal lip 224 and a bridge 242 with a first hinge 244 connecting the seal lip 224 to the bridge 242 and a second hinge 246 connecting the bridge 242 to the central portion 223 of the seal body 222. The relative thicknesses of the seal lip t1; bridge t2 and the first and second hinges t3, t4 are as discussed above. Further, the relative diameters H1D, H2D of the first and second hinges 244, 246 also remain as discussed above. Accordingly, thus far, other than the configuration of the mounting portion 218 and the seal 210 is the same as the seal 110. In addition, a projection 250 and a plurality of circumferentially spaced ribs 253 extending radially inwardly from the inner surface 252 of the projection 250 extend generally from the first hinge 244 and the bridge 242 toward the oil side O. The projection 250 has thickness extending between the inner surface 252 and outer surface 254, wherein the projection 250 and ribs 253 are shaped generally the same as that discussed with regard to the previously discussed projections 50, 150 and ribs 53, 153. The inner surface 252 and contact edges 255 of the ribs 253 have a minimum diameter PD that is greater than the maximum inner diameter of a sealing surface 234 of the seal lip 224, and thus, as discussed above with regard to the projection 50, 150, upon assembly on the shaft 212, the ribs 253 are spaced radially outwardly out of contact from the shaft running surface 235. The projection outer surface 254 extends in a smooth transition from the bridge 242 a sufficient length L2 to counter any forces tending to invert bridge 242, wherein the length L2 is less than the length L1 of the bridge 242, as discussed with regard to seal 110.

The notable distinction between the seal 210 and the previously discussed seal 110 can be seen with the addition of a plurality of stiffening ribs 60 molded as one piece of material with the seal body 222. The stiffening ribs 60 facilitate assembly and to maintain a sealing surface 234 of the seal lip 224 in proper sealing relation with the running surface 235 of the shaft 212 during and upon assembly. The stiffening ribs 60 extend axially along the bridge 242, and are shown here as extending along the upper or outer surface 254 of the projection 250 and along the full length of the bridge 242 and terminating at the central body portion 223 of the seal body 222. The stiffening ribs 60 can be provided in any suitable number sufficient to prevent reverse folding of the bridge 242 and the main seal lip 224 during assembly, and are shown in FIG. 20, as being about 60 stiffening ribs 60, by way of example and without limitation, spaced in radial alignment opposite a corresponding number of the skid ribs 253. Each stiffening rib 60 is spaced circumferentially from an adjacent stiffening rib 60, with the stiffening ribs 60 being spaced equidistant from one another about the circumference of the seal body 222. The height of the stiffening ribs 60 is such that an uppermost surface 62 of the stiffening ribs 60 remain spaced from the seal body 222 upon being assembled. As such, the stiffening ribs 60 do not interfere with the ability of the second hinge 246 to flex in use.

An oil side installation progression of the shaft 212 through the seal 210 is generally the same as discussed with regard to FIGS. 7-12 for a co-axially aligned installation, and the same as discussed with regard to FIGS. 13-19 for an axially misaligned installation. However, as the seal assembly 210 is moved axially onto to the shaft 212, and when the contact edges 255 of the skid ribs 253 engage the shaft 212, the stiffening ribs 60 are placed under slight tension and act to prevent the seal lip 224 and bridge 242 from inverting and unfolding. Further, the stiffening ribs 60 add rigidity to the projection 250, which further enhances the ability of the seal lip 224 to be maintained in sealing engagement with the shaft 212, such as when a vacuum is established on the oil-side O of the seal 210. As such, the seal lip 224 is assured of being maintained in a proper sealing orientation on the shaft 212 during and upon completion of the assembly process.

Figure 25:
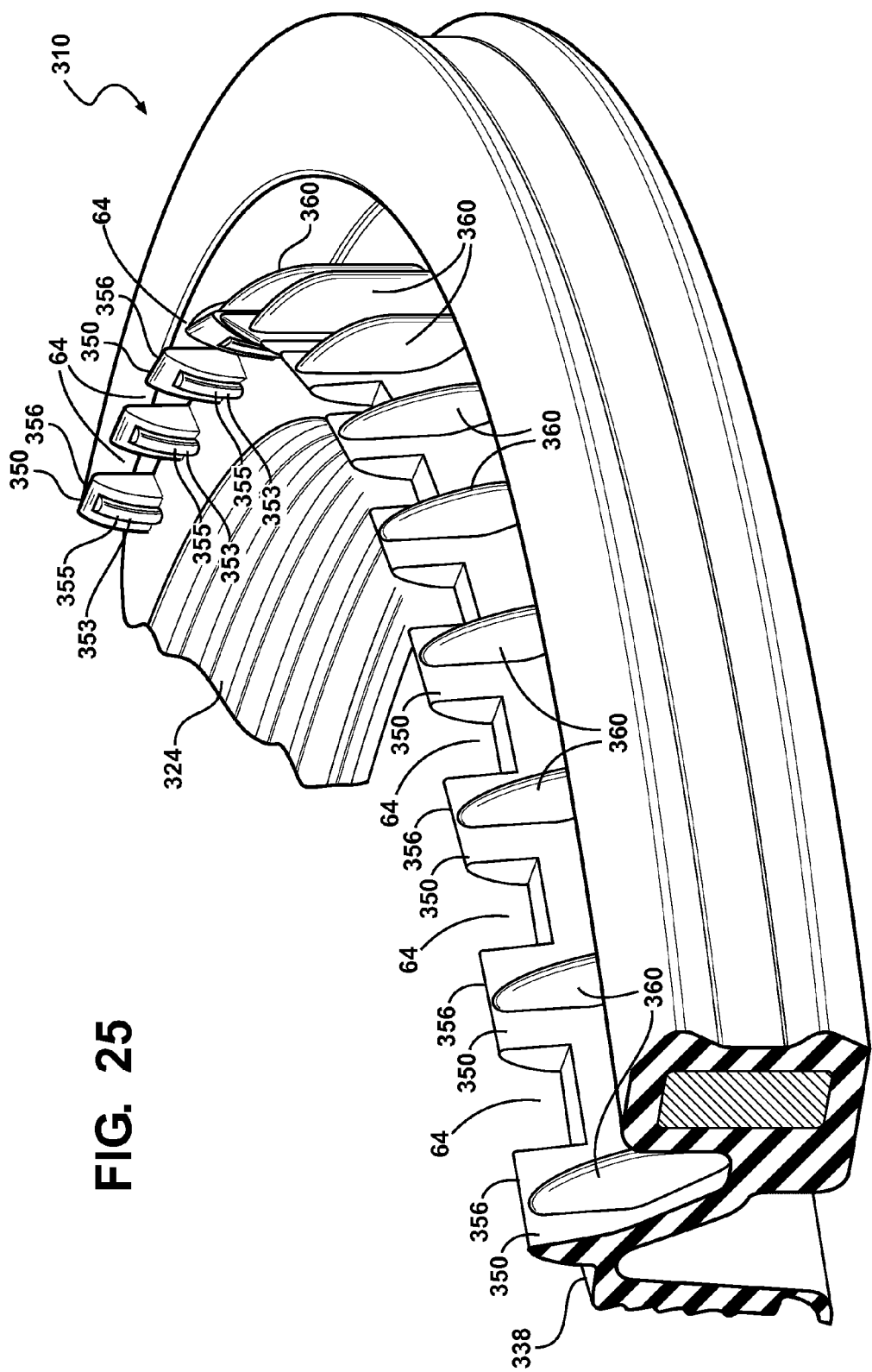
FIG. 25 is a partial perspective view of a radial shaft seal constructed according to yet another aspect of the invention.

FIG. 25 illustrate a portion of a seal 310 constructed in accordance with another aspect of the invention, wherein the same reference numerals as used above, offset by a factor of 300, are used to identify similar features as discussed above.

The seal 310 is similar to the seal 210, wherein all the features are the same with the exception that a plurality of gaps 64 extend axially into a projection 350, thereby providing a plurality of radially spaced projections 350 spaced radially from one another by the gaps 64. The gaps 64 and projections 350 are provided in uniformly spaced relation and size, thereby providing the seal 310 having a circumferentially symmetric appearance. The gaps 64 extend axially from an oil-side end of the seal lip 324 through to free ends 356 of adjacent projections 350. In the embodiment shown in FIG. 25, the gaps 64 occupy between about 20-50 percent of the total circumference (gaps 64+projections 350) of the seal body 322, though the percent could be varied, as desired. The gaps 64 provide enhance radial flexibility to the individually spaced projections 350 during assembly by allowing the projections 350 to flex individually relative to one another. The embodiment illustrated shows each individual projection 350 having a radially inwardly extending skid rib 353, wherein the skid ribs 353 and their associated narrowly profiled contact edges 355 function to minimize the friction generated against the shaft 312 during the oil-side installation process, as discussed above. In the embodiment shown, by way of example, each of the projections 350 also has one of the stiffening ribs 360 extending centrally along the upper surface of the projections 350 to enhance their stiffness, though it should be recognized that fewer stiffening ribs 360 could be used, depending on the application, thereby leaving at least some of the projections 350 without ribs.

Obviously, many modifications and variations of the present invention are possible in light of the above teachings. It is, therefore, to be understood that within the scope of the appended claims and any claims ultimately allowed, the invention may be practiced otherwise than as specifically described.

What is claimed is:

1. A radial shaft seal configured for receipt in a housing and about a shaft to sealingly isolate an air side of the shaft seal from an oil side of the shaft seal, comprising:
   an annular mounting portion;
   a seal lip having an annular sealing surface extending between an oil side end and a free air side end, said sealing surface being configured to extend axially relative to the shaft;
   an annular bridge connected to said oil side end of said seal lip by a first hinge and to said mounting portion by a second hinge, said bridge extending from said first hinge to said second hinge in radially overlying relation to said seal lip;
   at least one projection extending from said first hinge away from said bridge toward said oil side of said seal, said at least one projection having a radially outwardly facing outer surface and a radially inwardly facing inner surface; and
   a plurality of circumferentially spaced ribs extending radially inwardly from said inner surface, wherein said ribs have an inner minimum diameter and said sealing surface has an inner maximum diameter, said minimum diameter being greater than said maximum diameter.

2. The radial shaft seal of claim 1 wherein said seal lip has a radially outwardly facing surface with a maximum diameter and said minimum diameter of said ribs is greater than said outwardly facing maximum diameter of said seal lip.

3. The radial shaft seal of claim 1 wherein said at least one projection has a length extending away from said first hinge and said ribs extend substantially along said length of said at least one projection.

4. The radial shaft seal of claim 1 further comprising a plurality of circumferentially spaced stiffening ribs extending axially along said outer surface of said at least one projection and said bridge.

5. The radial shaft seal of claim 1 wherein said at least one projection is circumferentially continuous.

6. The radial shaft seal of claim 1 further comprising a plurality of said projections spaced from one another by gaps.

7. The radial shaft seal of claim 6 wherein each one of said projections has a separate one of said ribs.

8. The radial shaft of claim 7 wherein a plurality of stiffening ribs extend axially along said bridge and along at least some of said outer surfaces of said projections.

9. The radial shaft seal of claim 8 wherein said stiffening ribs extend along each of said projections.

10. A radial shaft seal assembly, comprising:
    a shaft extending along a central axis and providing a running surface with a predetermined diameter; and
    a radial shaft seal configured for receipt in a housing and about said shaft to sealingly isolate an air side of the radial shaft seal from an oil side of the radial shaft seal, comprising:
    an annular mounting portion;
    a seal lip having an annular sealing surface and an opposite backing surface extending between an oil side end and a free air side end, said sealing surface being configured to extend axially in dynamic sealing contact with said running surface;
    an annular bridge attached to said oil side end of said seal lip by a first hinge and to said mounting portion by a second hinge, said bridge extending from said first hinge to said second hinge in radially overlying relation to said seal lip;
    at least one projection extending axially from said first hinge toward said oil side of said seal, said at least one projection having a radially outwardly facing outer surface and a radially inwardly facing inner surface; and a plurality of circumferentially spaced ribs extending radially inwardly from said inner surface, wherein said ribs are spaced radially outwardly out of contact from said running surface of said shaft.

11. The radial shaft seal assembly of claim 10 wherein said at least one projection has a length extending away from said first hinge and said ribs extend substantially along said length of said at least one projection.

12. The radial shaft seal assembly of claim 10 further comprising a plurality of circumferentially spaced stiffening ribs extending axially along said outer surface of said at least one projection and said bridge.

13. The radial shaft seal assembly of claim 10 wherein said at least one projection is circumferentially continuous.

14. The radial shaft seal assembly of claim 10 further comprising a plurality of said projections spaced from one another by gaps.

15. The radial shaft seal assembly of claim 14 wherein each one of said projections has a separate one of said ribs.

16. The radial shaft assembly of claim 15 wherein a plurality of stiffening ribs extend axially along said bridge and along at least some of said outer surfaces of said projections.

17. The radial shaft seal assembly of claim 16 wherein said stiffening ribs extend along each of said projections.

* * * * *